INVENTOR
John O. Harrison 3,411,234
SAFETY DEVICE
John Osborn Harrison, P.O. Box 226, Beaverdell,
British Columbia, Canada
Filed Dec. 1, 1966, Ser. No. 598,246
1 Claim. (Cl. 43—97)

This invention relates to new and useful improvements in safety devices and more particularly to a safety device adapted to lock, in the open position, the jaws of an animal trap, in order to prevent the jaws from closing while the trap is being baited and set for operation.

Broadly, the invention comprises a somewhat H-shaped clamp secured to one of the jaws of a trap and adapted to straddle and lock the other jaw, having a hinged L-shaped locking pin to retain said second mentioned jaw in the locked position while the trap is being baited and set. When the trap is set and ready for operation, the locking pin is disengaged, then the trap can be sprung when the baited trigger is urged upon. The present invention provides a safety device which cannot be lost because it is secured to one of the jaws of the trap and only engages the other jaw while the trap is being baited and set for operation.

The main object of the invention is therefore the provision of a safety device to lock a jaw trap in the open position while it is being baited and set for operation to prevent users from injuries should the trap close during the process of baiting and setting.

Another important object is the provision of a means of attaching the safety device to a jaw of the trap so that it is not lost during the operation of the trap.

Other apparent objects are the dependability, the usefulness and the safety factor of the device taken along with the comparatively low manufacturing cost thereof.

With these and other objects in view that may appear as the description proceeds, the invention consists in the novel arrangement of cooperating elements as hereinafter more specifically set forth, claimed and shown in the accompanying drawing forming part of this application in which:

Figure 1:
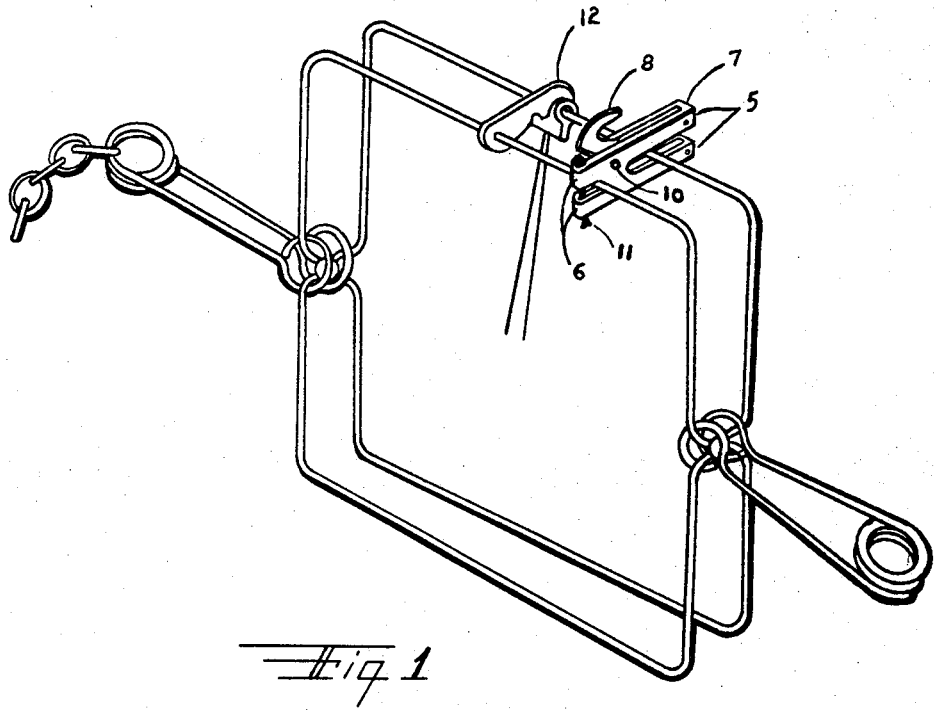
FIGURE 1 is a perspective view of an animal trap with my invention attached thereto.
Figure 2:
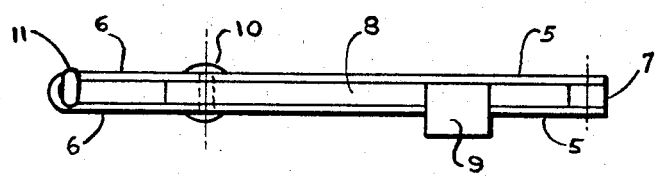
FIGURE 2 is a top plan view of the safety device per se.

Referring more in detail to the drawing in which similar reference characters designate corresponding parts throughout the several views, it will be seen that the invention comprises in association with the type of jaw trap as illustrated a safety device, for retaining the jaws in the open position while baiting and setting the device consisting of a pair of substantially H-shaped frames formed from a single piece of material bent on itself to provide a double frame and held in spaced apart relation by spacers 7 at one end thereof and having two long legs 5 and two shorter legs 6. A hook 8 formed with a finger hold 9 is pivotally secured at 10 between the frames.

Figure 3:
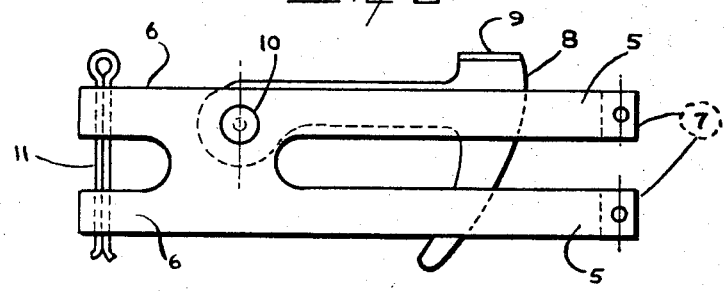
FIGURE 3 is a front elevational view of a safety device for a jaw trap constructed in accordance with the present invention.

In operation, the shorter legs 6 of the device are set to straddle one of the jaws of a trap, as illustrated in FIGURE 1 of the accompanying drawing and a cotter pin 11 or the like is inserted between the said frames to securely lock the safety device to a trap. When it is desired to bait and set the trap, the jaws thereof are opened and the long legs 5 of the safety device are arranged to straddle the opposing jaw of the trap and the hook 8 is urged completely within the frame, as illustrated in FIGURE 3 to safely and completely lock the trap in the open position. The trap is then baited and set ready for operation. When this process is completed the hook 8 is released, to free the jaw for operation and the trigger 12 will hold the trap in the open position until it is pressed upon by an animal.

It will be seen from the foregoing that I have provided a safety device for spring loaded jaw traps which will assure safe setting and baiting to users of such traps and prevent serious injuries.

It is believed that the construction and advantages have been fully set forth and that further detailed description is not required.

The embodiments of the invention in which an exclusive property or privilege is claimed are defined as follows:

I claim:

1. A safety device for a spring loaded jaw trap comprising a pair of substantially H-shaped frames formed of a single piece of material folded back on itself to provide a double frame, spacers to space apart the said frames at their free extremities, the said frames having a pair of substantially long legs and a pair of short legs, said short legs being adapted to straddle a jaw of a jaw trap, a cotter pin to secure said short legs to said jaw in straddling position, said long legs being adapted to straddle the opposing jaw of a trap and a hook member on said double frame provided with a finger grip to secure said second mentioned jaw in straddled position to said long legs while the trap is being baited and set for operation.

References Cited

UNITED STATES PATENTS 2,947,107   8/1960   Lehn _____ 43—92
3,010,245  11/1961   Conibear _____ 43—97 X
3,146,545   9/1964   Frost _____ 43—90

WARNER H. CAMP, *Primary Examiner.*